US011122668B1

(12) United States Patent
Xiong et al.

(10) Patent No.: US 11,122,668 B1
(45) Date of Patent: Sep. 14, 2021

(54) POWER SUPPLY AND POWER CLAMPING METHOD AT HIGH AMBIENT TEMPERATURES

(71) Applicant: Universal Lighting Technologies, Inc., Madison, AL (US)

(72) Inventors: Wei Xiong, Madison, AL (US); Levi Shareck, Madison, AL (US)

(73) Assignee: Universal Lighting Technologies, Inc., Madison, AL (US)

( * ) Notice: Subject to any disclaimer, the term of this patent is extended or adjusted under 35 U.S.C. 154(b) by 0 days.

(21) Appl. No.: 17/008,868

(22) Filed: Sep. 1, 2020

Related U.S. Application Data

(60) Provisional application No. 62/896,650, filed on Sep. 6, 2019.

(51) Int. Cl.
*H05B 45/37* (2020.01)
*H02N 1/08* (2006.01)
*H05B 45/56* (2020.01)
*H05B 45/18* (2020.01)

(52) U.S. Cl.
CPC ............. *H05B 45/56* (2020.01); *H05B 45/18* (2020.01)

(58) Field of Classification Search
CPC ........ H05B 45/10; H05B 45/12; H05B 45/18; H05B 45/37; H05B 45/3725; H05B 45/382; H05B 45/305; H05B 45/39; H02M 1/00; H02M 1/08; H02M 3/335; H02M 3/33553; H02M 3/33569; H02M 2001/0009; H02M 3/33507
See application file for complete search history.

(56) References Cited

U.S. PATENT DOCUMENTS 4,349,752 A 9/1982 Forte
5,696,431 A 12/1997 Giannopoulos et al.
5,864,472 A 1/1999 Peterson
5,914,865 A * 6/1999 Barbehenn ........ H02M 3/33523 363/21.15
7,595,969 B2 9/2009 Oba
(Continued)

OTHER PUBLICATIONS

International Rectifier: IRS27951S; IRS27952(4)S, 2015 International Rectifier Datasheet, Aug. 27, 2015, 29 pages.

*Primary Examiner* — Thai Pham
(74) *Attorney, Agent, or Firm* — Patterson Intellectual Property Law, P.C.; Gary L. Montle; Jerry Turner Sewell

(57) ABSTRACT

A resonant power converter is disclosed with a method of limiting output current therefrom. A switch operating frequency is regulated to provide output current to a load, wherein an error signal corresponds to a difference between the output current and a reference value. The error value is fed back to switch operating frequency control circuit via an optocoupler. A maximum detector diode current for the optocoupler is clamped to a maximum value when the error signal exceeds or equals a clamping threshold value. The clamping threshold value may correspond to a maximum output current at a maximum normal operating temperature, wherein the method utilizes the relationship between ambient temperature and the current transfer ratio (CTR) for the optocoupler. The CTR decreases when the detector diode current is clamped, which decreases output current and output power, reducing power loss in the enclosure and relieving thermal stress at high temperatures.

8 Claims, 6 Drawing Sheets

(56) References Cited

U.S. PATENT DOCUMENTS

| | | | | |
|---|---|---|---|---|
| 8,057,652 | B2 | 11/2011 | Routbort et al. | |
| 9,112,415 | B2 | 8/2015 | Grakist et al. | |
| 9,237,613 | B1 | 1/2016 | Xiong et al. | |
| 9,837,913 | B1 * | 12/2017 | Xiong | H05B 45/39 |
| 10,098,194 | B1 | 10/2018 | Xiong | |
| 10,243,473 | B1 | 3/2019 | Xiong et al. | |
| 10,476,399 | B1 | 11/2019 | Xiong | |
| 10,952,299 | B1 * | 3/2021 | Xiong | H02M 1/00 |
| 2004/0160794 | A1 | 8/2004 | Lin | |
| 2010/0277957 | A1 | 11/2010 | Chueh et al. | |
| 2012/0153858 | A1 | 6/2012 | Melanson et al. | |
| 2013/0099788 | A1 | 4/2013 | Xu et al. | |
| 2013/0271021 | A1 | 10/2013 | Elferich | |
| 2014/0091720 | A1 * | 4/2014 | Brinlee | H05B 47/10 315/186 |
| 2014/0167640 | A1 | 6/2014 | Knoedgen | |
| 2014/0252981 | A1 | 9/2014 | Xie et al. | |
| 2014/0265844 | A1 * | 9/2014 | Sadwick | H05B 45/37 315/85 |
| 2015/0103562 | A1 | 4/2015 | Yeh et al. | |
| 2015/0257222 | A1 | 9/2015 | Siessegger et al. | |
| 2016/0014858 | A1 | 1/2016 | Ramabhadran et al. | |
| 2016/0057825 | A1 | 2/2016 | Hu et al. | |
| 2016/0073457 | A1 | 3/2016 | Nakajo | |
| 2016/0190945 | A1 | 6/2016 | Liu et al. | |
| 2016/0276936 | A1 | 9/2016 | Gritti | |
| 2017/0093296 | A1 * | 3/2017 | Chen | H02M 1/088 |
| 2017/0179831 | A1 | 6/2017 | Yu et al. | |
| 2017/0187298 | A1 | 6/2017 | Lin | |
| 2017/0222565 | A1 | 8/2017 | Sonobe | |
| 2017/0373496 | A1 * | 12/2017 | Hu | H02M 3/33561 |
| 2018/0153020 | A1 | 5/2018 | Sun et al. | |
| 2018/0234019 | A1 | 8/2018 | Chen | |
| 2018/0243019 | A1 * | 8/2018 | Suh | A61B 17/7001 |
| 2018/0262118 | A1 * | 9/2018 | Ouyang | H02M 3/335 |
| 2020/0389093 | A1 * | 12/2020 | Tietema | H05B 45/385 |

* cited by examiner

POWER SUPPLY AND POWER CLAMPING METHOD AT HIGH AMBIENT TEMPERATURES

CROSS-REFERENCES TO RELATED APPLICATIONS

This application claims benefit under 35 USC. § 119(e) of U.S. Provisional patent Application No. 62/896,650, filed Sep. 6, 2019, entitled "Power Clamping Method at High Ambient Temperature by Using Opto CTR Characteristic."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

FIELD OF THE INVENTION

The present disclosure relates generally to power supplies that provide a DC voltage to a load, such as, for example, an array of light-emitting diodes. More particularly, the present disclosure relates to an apparatus and method for controlling the output power of a power supply at high ambient temperatures.

BACKGROUND

Constant-power tunable LED drivers are very popular in the lighting market because of their flexibility to drive different LED loads at different current levels. A single constant-power driver must pass Underwriter Laboratories (UL) safety tests before it can be sold to customers. One such test is a Class P thermal test. During the Class P test, a LED driver will be put in a temperature-controlled oven and the LED driver hot spot will be continuously monitored. The temperature of the oven will gradually increase from 40 C to 80 C. During said temperature increase the LED driver hot spot must not be greater than 110 C in order to pass the UL Class P test.

For low wattage drivers (e.g., 50 w-100 w), it may be easy to pass the Class P test because the power loss in the driver enclosure is relatively low. However, for high wattage drivers (e.g., 180-200 w), it may be difficult to pass the Class P test simply because the power loss is larger. In order to pass the Class P test, most of the driver designers limit the power output when ambient temperature reaches certain high threshold temperature (e.g., 70 C), so that the power loss can be reduced and the hot spot temperature can be controlled less than 110 C.

One known method to limit the output power at high ambient temperatures is to implement a negative temperature coefficient (NTC) resistor on the PCB to sense the internal temperature. Once the NTC temperature reaches its knee temperature, its resistance will increase sharply and a micro-controller may sense this resistance increase and change the output power setting accordingly.

One drawback of using the NTC resistor solution is that NTC resistance increase very sharply when its temperature reaches the knee point, and as such the micro-controller may perform a sudden adjustment for the output power. For a customer, the light output would suddenly change once the temperature reaches a certain point (e.g., the knee point).

BRIEF SUMMARY

Accordingly, a need exists for methods and associated circuitry which is configured to product a gradual light reduction in response to an ambient temperature increase. The disclosed power clamping method and associated circuitry offers gradual power clamping as temperature increases.

A particular embodiment of a resonant power converter and associated method is disclosed herein for limiting output current therefrom. A switch operating frequency is regulated to provide output current to a load, wherein an error signal corresponds to a difference between the output current and a reference value. The error value is fed back to switch operating frequency control circuit via an optocoupler. A maximum detector diode current for the optocoupler is clamped to a maximum value when the error signal exceeds or equals a clamping threshold value. The clamping threshold value may correspond to a maximum output current at a maximum normal operating temperature, wherein the method utilizes the relationship between ambient temperature and the current transfer ratio (CTR) for the optocoupler. The CTR decreases when the detector diode current is clamped, which decreases output current and output power, reducing power loss in the enclosure and relieving thermal stress at high temperatures.

In one exemplary aspect of the aforementioned embodiment, the clamping threshold value is about 85% of a maximum error signal.

In another exemplary aspect of the aforementioned embodiment, a detector diode current limiting circuit includes a first resistor and a second resistor connected in series between a feedback circuit and a frequency control circuit, the detector diode current limiting circuit further including a node between the first resistor and the second resistor.

In another exemplary aspect of the aforementioned embodiment, the detector diode current limiting circuit includes a Zener diode coupled to the node between the first resistor and the second resistor; and the Zener diode is configured to limit the effect of the error signal on the detector diode current by clamping the voltage across the second resistor when the error signal is greater than or equal to a clamping threshold value.

In another exemplary aspect of the aforementioned embodiment, a Zener value of the Zener diode is about 65% of a maximum error signal.

In another exemplary aspect of the aforementioned embodiment, a resistance value of at least one of the at least one resistor is based at least in part on a Zener value of the Zener diode and the clamping threshold value.

DETAILED DESCRIPTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention.

The following detailed description of embodiments of the present disclosure refers to one or more drawings. Each drawing is provided by way of explanation of the present disclosure and is not a limitation. Those skilled in the art will understand that various modifications and variations can be made to the teachings of the present disclosure without departing from the scope of the disclosure. For instance, features illustrated or described as part of one embodiment can be used with another embodiment to yield a still further embodiment.

The present disclosure is intended to cover such modifications and variations as come within the scope of the appended claims and their equivalents. Other objects, features, and aspects of the present disclosure are disclosed in the following detailed description. One of ordinary skill in the art will understand that the present discussion is a description of exemplary embodiments only and is not intended as limiting the broader aspects of the present disclosure.

Figure 1:
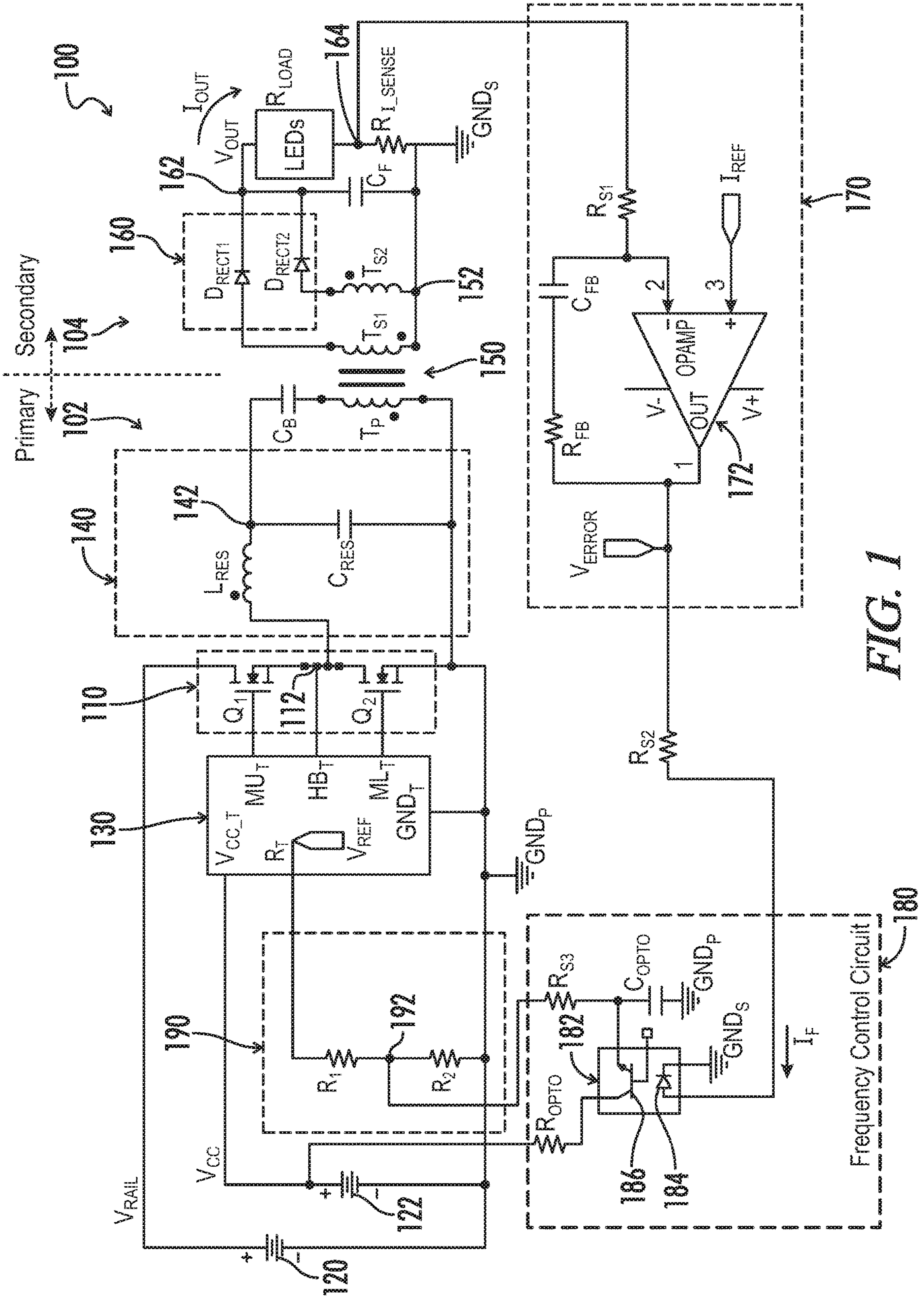
FIG. 1 illustrates a half-bridge resonant type DC-to-DC converter.

Referring to FIG. 1, a half-bridge resonant type DC-DC converter 100 is provided. The half-bridge resonant type DC-DC converter 100 may also be referred to herein as a partially clamped resonant converter 100 or a tunable constant power LED driver.

The converter 100 includes a primary circuit 102 and a secondary circuit 104, which are electrically isolated as described below. The converter includes a first switch $Q_1$ and a second switch $Q_2$ in a half-bridge switching circuit 110. The switches may be, for example, metal oxide semiconductor field effect transistors (MOSFETs) or bipolar junction transistors (BJTs). In the illustrated embodiment, the two switches are n-channel MOSFETs. The half-bridge switching circuit is connected between a DC input bus $V_{RAIL}$ and a primary circuit ground reference $GND_P$. The DC input bus $V_{RAIL}$ may be considered as a first voltage rail; and the primary circuit ground reference may be considered as a second voltage rail. The drain of the first switch is connected to the DC input bus. The source of the first switch is connected to the drain of the second switch at a common switched node 112 of the half-bridge switching circuit. The source of the second switch is connected to the primary circuit ground reference.

In the illustrated embodiment, the voltage on the DC input bus $V_{RAIL}$ is provided by a first DC voltage source 120. In the illustrated embodiment, the first DC voltage source is illustrated as a battery; however, it should be understood that the voltage on the DC input bus may be provided by other sources, such as, for example, a power factor correction (PFC) stage, the DC output of a bridge rectifier, or the like, which are supplied from an AC source (not shown). The battery is representative of a variety of voltage sources that provide a substantially constant voltage on the DC input bus.

Each of the first switch $Q_1$ and the second switch $Q_2$ has a respective control input terminal. In the illustrated embodiment incorporating MOSFETs, the control input terminals are the gates of the two transistors. The control input terminals are driven by a self-oscillating half-bridge gate driver integrated circuit (IC) 130, which may also be referred to as a switch controller. In an illustrated embodiment, the driver IC (switch controller) 130 may be, for example, an NCP1392B high-voltage half-bridge driver with inbuilt oscillator, which is commercially available from ON Semiconductor Company of Phoenix, Ariz. The driver IC 130 is powered by a second DC voltage source 122 via an input terminal $V_{CC\_T}$ of the driver IC 130. In FIG. 1, the second DC voltage source is illustrated as a battery that provides a voltage $V_{CC}$; however, it should be understood that the second DC voltage source may also be derived from an AC source.

The driver IC (switch controller) 130 is responsive to a timing resistance connected to a timing terminal $R_T$ to alternately apply an upper drive voltage on an upper drive terminal $MU_T$ and apply a lower drive voltage to a lower drive terminal $ML_T$. The upper output drive voltage is applied to the control input terminal of the first switch $Q_1$. The lower output drive voltage is applied to the control input terminal of the second switch $Q_2$. When the resistance applied to the timing terminal RT of the driver IC 130 increases, the current flowing out of the timing terminal decreases, which causes the frequency of the drive voltages applied to the two switches to decrease. When the resistance applied to the timing terminal RT of the driver IC 130 decreases, the current flowing out of the timing terminal increases, which causes the frequency of the drive voltages to increase. A ground terminal $GND_T$ of the driver IC 130 is coupled to the primary circuit ground $GND_P$. The driver IC 130 may include other terminals that are not shown in FIG. 1.

The common switched node 112 of the half-bridge switching circuit 110 is connected to a half bridge connection terminal $HB_T$ of the driver IC 130. The first and second switches Q1, Q2 provide a high frequency AC voltage input to a resonant circuit 140. The common switched node 112 may also connected to a first terminal of a resonant inductor $L_{RES}$ of the resonant circuit 140. A second terminal of the resonant inductor $L_{RES}$ is connected to a first terminal of a resonant capacitor $C_{RES}$ at an output node 142 of the resonant circuit 140. A second terminal of the resonant capacitor $C_{RES}$ is connected to the primary circuit ground reference $GND_P$. The resonant capacitor $C_{RES}$ is specifically designed so that the resonant circuit 140 will always have soft-switching within a certain frequency range (i.e., between a minimum frequency $f_{min}$ and a maximum frequency $f_{max}$).

The output node 142 of the resonant circuit 140 is connected to a first terminal of a DC blocking capacitor $C_B$. A second terminal of the DC blocking capacitor $C_B$ is connected to a first terminal of a primary winding $T_P$ of an output isolation transformer 150. A second terminal of the primary winding $T_P$ of the output isolation transformer 150 is connected to the primary circuit ground reference $GND_P$. The foregoing components on the primary circuit 102 of the half-bridge switching circuit 110 operate as a DC to AC inverter to produce an AC voltage across the primary winding $T_P$ of the output isolation transformer 150.

The output isolation transformer 150 includes a first secondary winding $T_{S1}$ and a second secondary winding $T_{S2}$. The two secondary windings $T_{S1}$, $T_{S2}$ are electrically isolated from the primary winding $T_P$. As illustrated, the primary winding $T_P$ is electrically part of the primary circuit 102, and the secondary windings $T_{S1}$, $T_{S2}$ are electrically part of the secondary circuit 104. The two secondary windings $T_{S1}$, $T_{S2}$ have respective first terminals, which are connected at a center tap 152. Respective second terminals of the first and second secondary windings $T_{S1}$, $T_{S2}$ are connected to input terminals of a half-bridge rectifier 160 for rectifying the voltage on the first and second secondary windings $T_{S1}$, $T_{S2}$ into a DC voltage. The half-bridge rectifier 160 comprises a first rectifier diode $D_{RECT1}$ and a second rectifier diode $D_{RECT2}$. The second terminal of the first secondary winding $T_{S1}$ is connected to the anode of the first rectifier diode $D_{RECT1}$. The second terminal of the second secondary winding $T_{S2}$ is connected to the anode of the second rectifier diode $D_{RECT2}$. The cathodes of the two rectifier diodes are connected together at an output node 162 of the half-bridge rectifier 160. The center tap 152 of the first and second secondary windings $T_{S1}$, $T_{S2}$ is connected to a secondary circuit ground reference GNDs. In other embodiments having a single, non-center-tapped secondary winding (not shown), the half-bridge rectifier with the two rectifier diodes may be replaced with a full-bridge rectifier with four rectifier diodes.

The output node 162 of the half-bridge rectifier 160 is connected to a first terminal of an output filter capacitor CF. A second terminal of the output filter capacitor is connected to the secondary circuit ground reference GNDs. An output voltage ($V_{OUT}$) is developed across the output filter capacitor at the output node 162 of the half-bridge rectifier 160. The output node 162 of the half-bridge rectifier 160 is also connected to a first terminal of a load $R_{LOAD}$, which may comprise, for example, one or more light-emitting didoes (LEDs) that emit light when sufficient current passes through the LEDs. A second terminal of the load is connected to a current sensing node 164 and to the first terminal of a current sensing resistor $R_{I\_SENSE}$. A second terminal of the current sensing resistor $R_{I\_SENSE}$ is connected to the secondary circuit ground reference GNDs. When output current ($I_{OUT}$) flows through the load $R_{LOAD}$, the same current flows through the current sensing resistor $R_{I\_SENSE}$. Accordingly, a voltage develops on the current sensing node 164 that has a magnitude with respect to the secondary circuit ground reference GNDs that is proportional to the output current flowing through the load $R_{LOAD}$. In one embodiment, the current sensing resistor $R_{I\_SENSE}$ has a resistance of, for example, 0.1 ohm such that the effect of the resistance of the current sensing resistor $R_{I\_SENSE}$ on the output current is insignificant.

When the driver IC 130 operates to apply alternating drive voltages to the first switch Q1 and the second switch Q2, an AC voltage develops across the resonant capacitor $C_{RES}$. The voltage across the resonant capacitor $C_{RES}$ may include a DC component; however, the DC blocking capacitor $C_B$ transfers only the AC component of the energy stored in the resonant capacitor $C_{RES}$ to the primary winding $T_P$ of the output isolation transformer 150. The transferred energy is magnetically coupled from the primary winding $T_P$ to the electrically isolated first and second secondary windings $T_{S1}$, $T_{S2}$. The first and second rectifier diodes $D_{RECT1}$, $D_{RECT2}$ in the half-bridge rectifier 160 rectify the AC energy from the first and second secondary windings $T_{S1}$, $T_{S2}$ into DC energy, which is provided on the output node 162. The DC energy is stored in the output filter capacitor $C_F$ at a voltage determined by the amount of stored energy. Current from the output filter capacitor $C_F$ is provided to the load $R_{LOAD}$ at a magnitude determined by the voltage on the half-bridge rectifier output node and the resistance of the load.

Because the intensity of the light emitted by the LEDs in the load $R_{LOAD}$ is dependent on the magnitude of the current flowing through the LEDs, the current is controlled closely. The current sensing resistor $R_{I\_SENSE}$ senses the current $I_{OUT}$ going through the load $R_{LOAD}$ and develops a sensor voltage $V_{I\_SENSE}$ on the current sensing node 164 proportional to the load current $I_{OUT}$. The sensor voltage $V_{I\_SENSE}$ may also be referred to herein as a sensor output signal. The sensor voltage $V_{I\_SENSE}$ representing the sensed current $I_{SENSE}$ is fed back to a feedback circuit 170 to provide current regulation.

The feedback circuit 170 is configured to regulate the output current $I_{OUT}$ through the load $R_{LOAD}$ at a reference current $I_{REF}$. The feedback circuit 170 may also be referred to herein as a proportional integral (PI) current control loop 170 or a PI negative feedback control loop 170. The reference current $I_{REF}$ may also be referred to herein as a reference signal $I_{REF}$. The output current $I_{OUT}$ can also be referred to herein as a load current $I_{OUT}$. The feedback circuit 170 includes an operational amplifier (OPAMP) 172 having an inverting (−) input terminal, having a non-inverting (+) input terminal, and having an output (OUT) on an output terminal. The current sensing node 164 is connected to the inverting input of the OPAMP 172 via a first series resistor $R_{S1}$. A feedback resistor $R_{FB}$ and a feedback capacitor $C_{FB}$ are connected in series between the output terminal of the OPAMP 172 and the inverting input. The feedback resistor $R_{FB}$ may also be referred to herein as a gain control resistor. The feedback capacitor $C_{FB}$ may also be referred to herein as an integration capacitor. The first series resistor $R_{S1}$ and the feedback resistor $R_{FB}$ determine the proportional gain of the feedback circuit 170. The first series resistor $R_{S1}$ and the feedback capacitor $C_{FB}$ determine the crossover frequency of the feedback circuit 170. The reference current $I_{REF}$ is connected to the non-inverting input of the OPAMP 172.

The magnitude of the reference current $I_{REF}$ is selected to produce a desired output current $I_{OUT}$ through the load $R_{LOAD}$. The reference current $I_{REF}$ may be a fixed reference current to provide a constant load current. A tuning interface, such as, for example, a dimmer, can be provided for adjusting the magnitude of the reference current $I_{REF}$ whenever is necessary to drive a specific load. If the reference current $I_{REF}$ changes to a new magnitude, the output current $I_{OUT}$ is adjusted and maintained constant relative to the new magnitude. The OPAMP 172 is responsive to a difference in the magnitudes of the reference current $I_{REF}$ and the sensor voltage $V_{I\_SENSE}$ at the current sensing node 164 to generate an error signal $V_{ERROR}$. The error signal $V_{ERROR}$ is used to control the operating frequency $f_{op}$ of the driver IC 130 as described below. The OPAMP 172 may also be considered as a comparator because the OPAMP 172 compares the magnitudes of the two input signals and generates an output signal having a magnitude responsive to a difference between the magnitudes of the two input signals.

During operation of the OPAMP 172, when the output current $I_{OUT}$ is lower than the reference current $I_{REF}$ the error signal $V_{ERROR}$ at the output terminal will increase. When the output current $I_{OUT}$ is greater than the reference current $I_{REF}$ the error signal $V_{ERROR}$ at the output terminal will decrease. The error signal $V_{ERROR}$ is fed to a frequency control circuit 180 to achieve close loop frequency control in order to maintain a constant output current when the load $R_{LOAD}$ changes.

The output terminal of the OPAMP 172 is connected to the input stage of an optocoupler 182 of the frequency control circuit 180 via a second series resistor $R_{S2}$. The optocoupler 182 may also be referred to herein as an opto isolator, or an optical isolator. The input stage of the optocoupler 182 includes a detector diode 184 coupled to the input of the optocoupler. The detector diode 184 may also be referred to herein as an internal light generation device (e.g., an LED). The detector diode is responsive to a voltage (e.g., the error signal $V_{ERROR}$) applied to the input stage to generate light. The applied voltage is referenced to the secondary circuit ground reference GNDs to which the detector diode is connected. The light generated by the detector diode is propagated internally to a light-responsive base of a phototransistor 186 in an output stage within the same component. The phototransistor has an emitter and a collector. The emitter is connected to the primary circuit ground reference $GND_P$ through an optocoupler capacitor $C_{OPTO}$. The impedance of the phototransistor 186 between the collector and the emitter in the output stage of the optocoupler is responsive to the light generated by the input stage. Thus, the impedance of the output stage is responsive to the voltage applied to the input stage. In the illustrated embodiment, increasing the voltage applied to the input stage decreases the impedance of the output stage, and decreasing the voltage applied to the input stage increases the impedance of the output stage. The optocoupler electrically isolates the secondary circuit voltages and the secondary circuit ground reference GNDs in the secondary circuit 104 from the primary circuit voltages and the primary circuit ground reference $GND_P$ in the primary circuit 102.

In the example shown, the collector of the phototransistor 186 in the output stage of the optocoupler 182 is connected to the second DC voltage source 122 through an optocoupler resistor $R_{OPTO}$.

Figure 2:
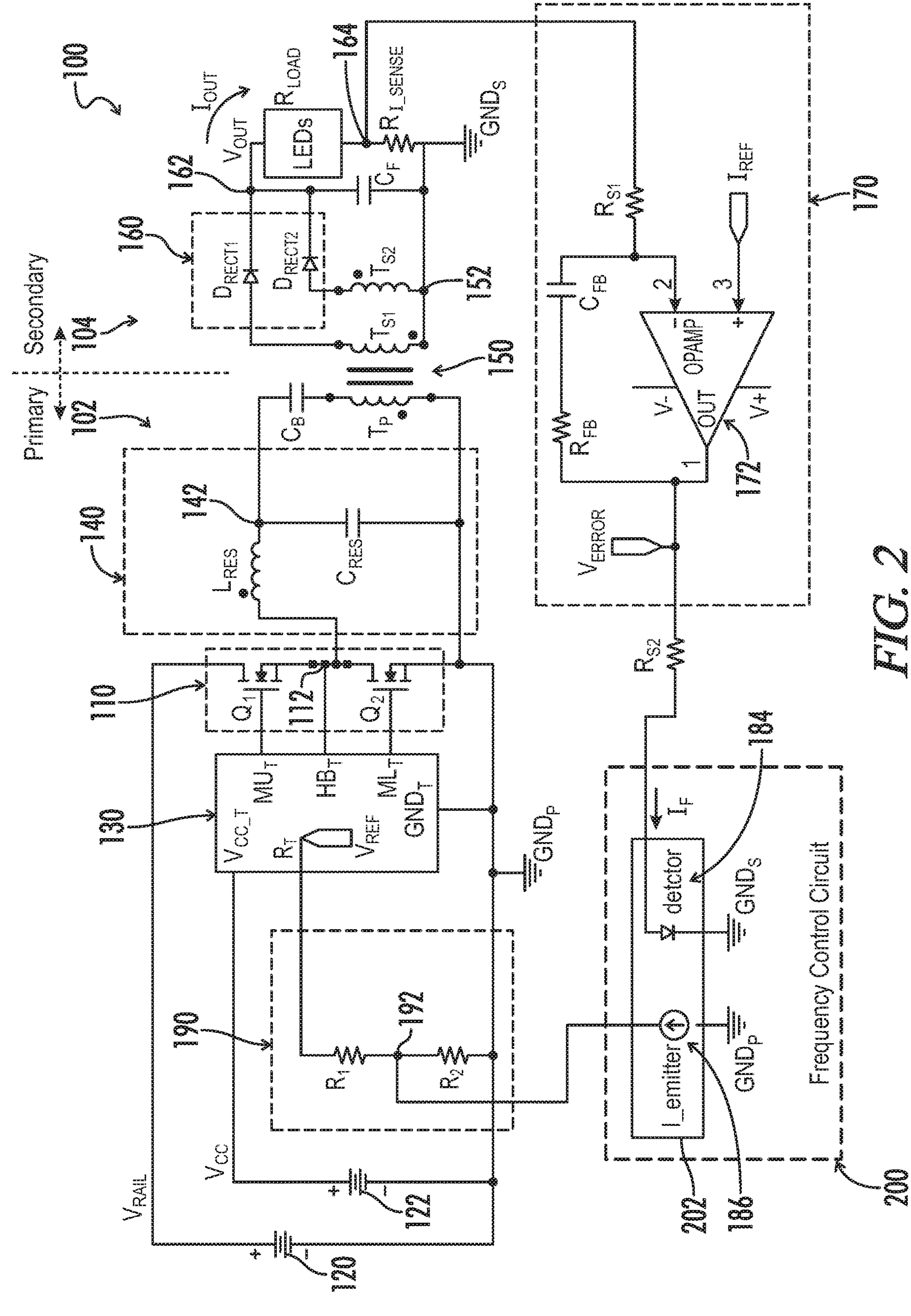
FIG. 2 illustrates the half-bridge resonant type DC-to-DC converter of FIG. 1 including an equivalent frequency control circuit.

Referring to FIG. 2, an equivalent frequency control circuit 200 of the half-bridge resonant type DC-DC converter 100 is shown. The optocoupler 182 of the frequency control circuit 180 is basically a controlled current source 202. The emitter current $I_{emitter}$, which may also be referred to herein as a collector current $I_C$, if the phototransistor 186 is proportional to the detector diode current $I_F$ of the detector diode 184 in accordance with a current transfer ratio (CTR). The relationship follows:

$$CTR = \frac{I_{emiiter}}{I_F} = \frac{I_c}{I_F} \quad (1)$$

Referring to FIG. 1, the emitter of the phototransistor 186 of the output stage of the optocoupler 182 is further connected to a node 192 of a voltage divider circuit 190 through a third series resistor $R_{S3}$. The voltage divider circuit 190 includes a first resistor $R_1$ and a second resistor $R_2$ coupled in series between the timing terminal RT of the driver IC 130 and the primary circuit ground reference $GND_P$. The node 192 of the voltage divider circuit 190 is defined between the first resistor $R_1$ and the second resistor $R_2$.

The frequency control circuit 180 receives the error signal $V_{ERROR}$ from the feedback circuit 170 and adjusts the operating frequency $f_{op}$ of the driver IC 130. The frequency control driver IC is directly proportional to the current that flows out the timing terminal RT of the driver IC 130, which is internally connected to a reference voltage $V_{REF}$. The operating frequency $f_{op}$ follows the equation:

$$f_{op}=I_{RT}\cdot 250(\text{KHz/mA}) \quad (2)$$

Figure 3:
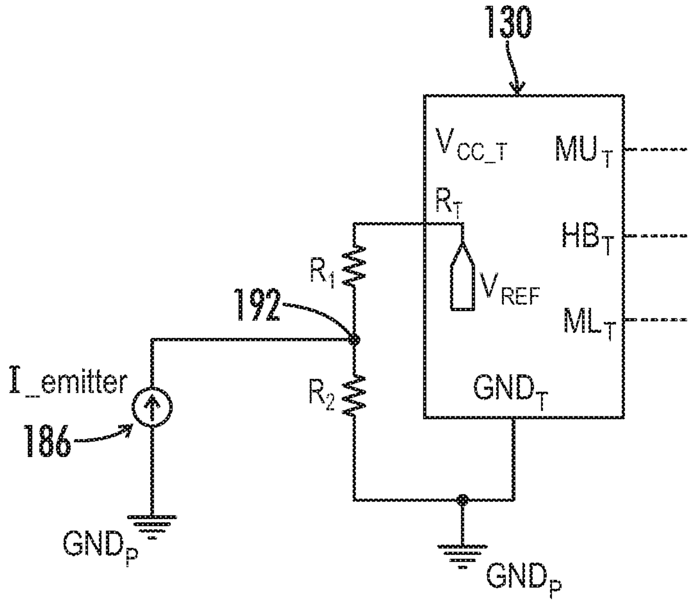
FIG. 3 illustrates a portion of the equivalent frequency control circuit of FIG. 2.

Referring to FIG. 3, a portion of the equivalent frequency control circuit 200 of the half-bridge resonant type DC-DC converter 100 in conjunction with the driver IC 130 and voltage divider circuit 190 is shown. The total current $I_{Rt}$ that flows out of the timing terminal $R_T$ of the driver IC 130 may be obtained using the superposition principal as follows:

$$I_{Rt} = \frac{V_{ref}}{R_1+R_2} - I_{emitter} \times \frac{R_2}{R_1+R_2} \quad (3)$$

The relationship between the operating frequency $f_{op}$ and the detector diode current $I_F$ can be obtained by combining equations (1-3) as follows:

$$f_{op} = \left(\frac{V_{ref}}{R_1+R_2} - CTR \times I_F \times \frac{R_2}{R_1+R_2}\right) \times 250\left(\frac{\text{KHz}}{\text{mA}}\right) \quad (4)$$

Equation (4) shows that the high the detector diode current $I_F$ and the current transfer ratio (CTR) of the optocoupler 182, the lower the operating frequency $f_{op}$.

Figure 4:
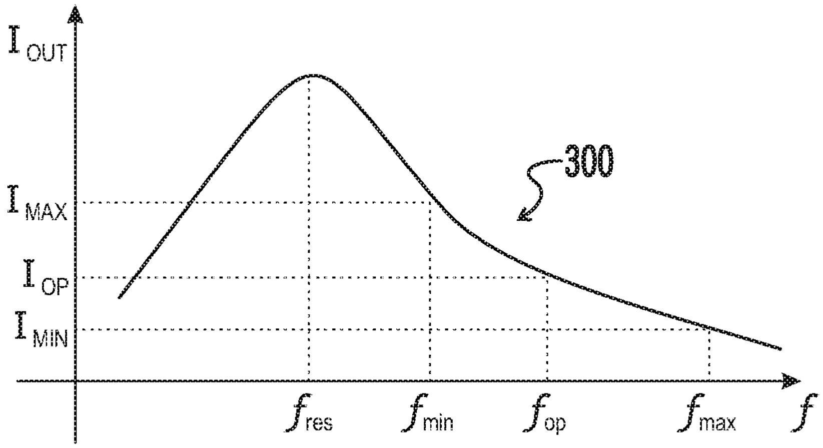
FIG. 4 illustrates a graph of the current gain curve of the output current versus frequency of the half-bridge resonant type DC-DC converter of FIG. 1

Referring to FIG. 4, a current gain curve graph 300 of the output current $I_{OUT}$ through the load $R_{LOAD}$ versus frequency f is provided for the half-bridge resonant type DC-DC converter 100.

For the half-bridge resonant type DC-DC converter 100 it is critical to make sure that the operating frequency $f_{op}$ is always greater than the self-resonant frequency $f_{res}$ of the driver IC 130 to ensure soft switching. The output current $I_{OUT}$ may decrease when operating frequency $f_{op}$ increases. The maximum current $I_{MAX}$ occurs at minimum operating frequency $f_{min}$ and the minimum output current IMIN occurs at maximum operating frequency, $f_{max}$. The minimum operating frequency $f_{min}$ may be designed to be always greater than self-resonant frequency $f_{res}$.

Based on these relationships, it is important to control the operating frequency $f_{op}$ in order to control the output current $I_{OUT}$ as ambient temperature increases during a UL Class P test.

Figure 5:
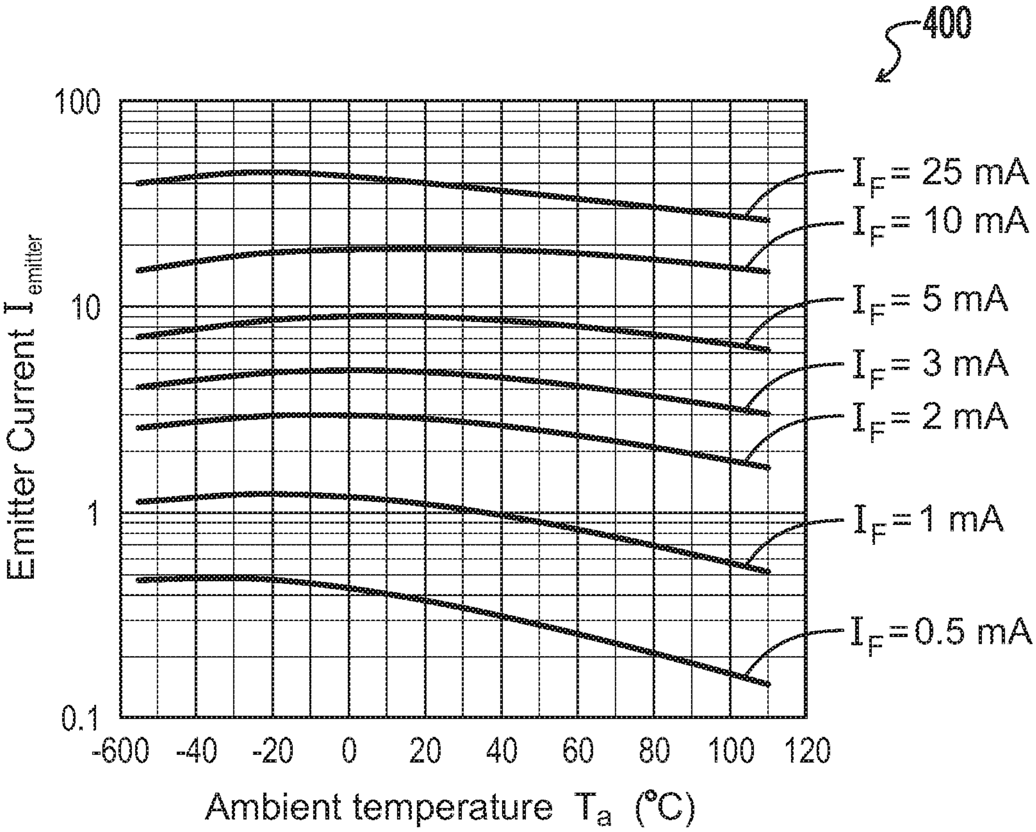
FIG. 5 illustrates a graph of the relationship between the diode detector current and the emitter current of an optocoupler of the half-bridge resonant type DC-to-DC converter of FIG. 1.

Referring to FIG. 5, a graphical representation 400 of the relationship between the emitter current $I_{emitter}$ and the detector diode current IF of an optocoupler 182 over a range of temperatures is shown. The optocoupler may be, for example, a TLP385 photocoupler, which is commercially available from Toshiba Electronic Devices & Storage Corporation. From FIG. 5 and equation (1), it can be seen that for a certain detector diode current $I_F$, CTR decreases as temperature increases.

For example, if the detector diode current IF equals 1 mA, then at 35 C the CTR may equal 1 and at 100 C the CTR may equal 0.6, as shown in FIG. 5. From equation (4), it can be seen that if the detector diode current IF is fixed, then the operating frequency $f_{op}$ will increase as the CTR decreases. Additionally, when the operating frequency $f_{op}$ increases, the output current $I_{OUT}$ will decreases, as will the output power, shown in FIG. 4.

From the above analysis, the present disclosure leverages the relationship between CTR and temperature to limit the output current $I_{OUT}$ as well as output power, and additionally hot spot temperature, as the ambient temperature changes. One of the simplest and most efficient ways to achieve this goal is make sure that the detector diode current IF is fixed once the temperature reaches a certain point.

Figure 6:
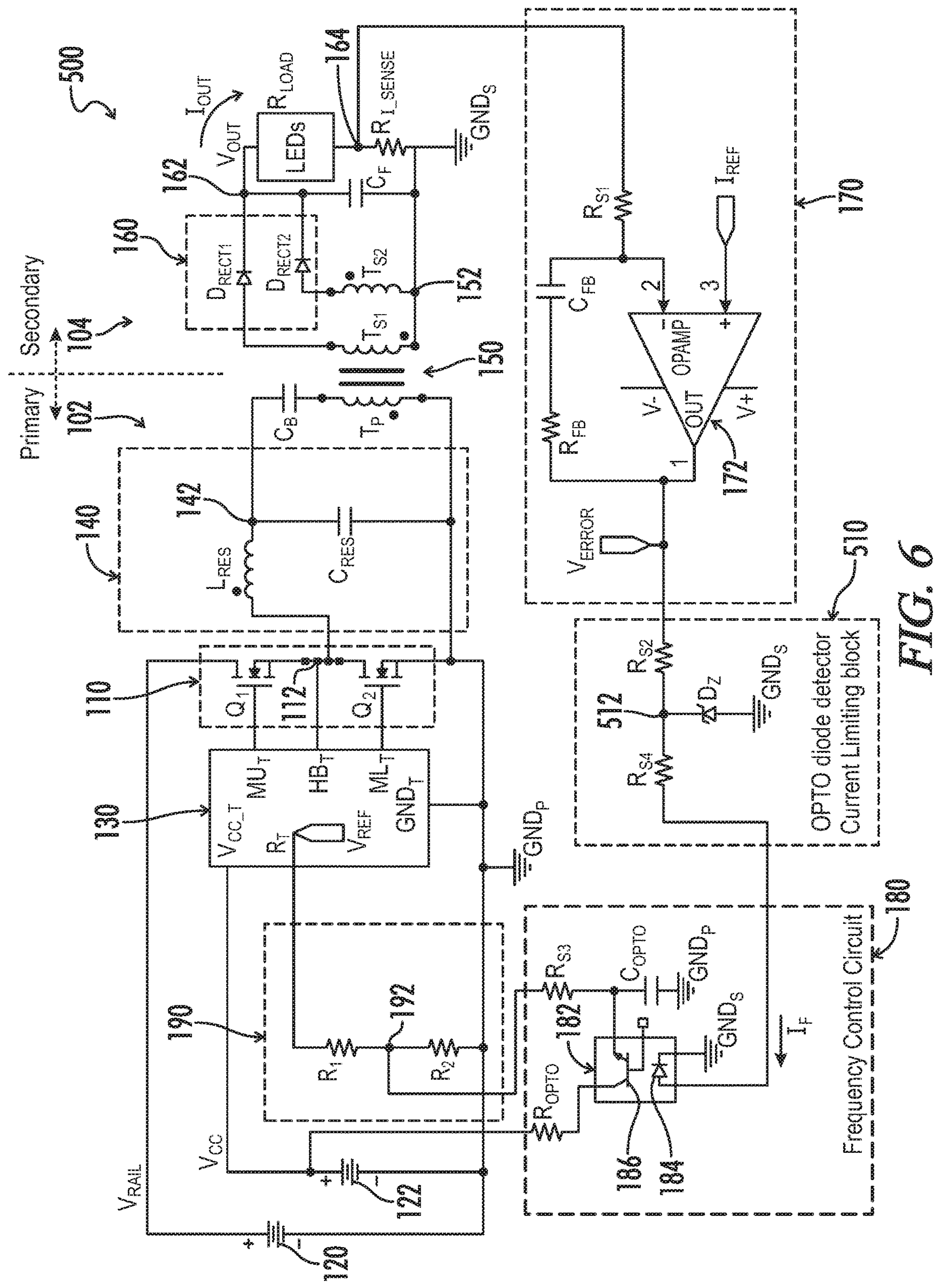
FIG. 6 illustrates an improved half-bridge resonant type DC-to-DC converter including power clamping circuitry in accordance with the present disclosure.

Referring to FIG. 6, an improved half-bridge resonant type DC-DC converter 500 configured to achieve the power clamping goal when ambient temperature increases is shown. A detector diode current limiting circuit 510 is added to the original converter 100 of FIG. 1, as shown in FIG. 6. Similar elements of the converter 500, shown in FIG. 6, are numbered similar to those of the converter 100, shown in FIG. 1.

The detector diode current limiting circuit 510 is coupled between the feedback circuit 170 and the frequency control circuit 180. The detector diode current limiting circuit 510 includes a Zener diode Dz that is configured to limit the maximum current (e.g., $I_F$) that can be driven into the detector diode 184 of the optocoupler 182. The detector diode current limiting circuit 510 may further include the second series resistor $R_{S2}$ coupled in series with a fourth series resistor $R_{S4}$ between the feedback circuit 170 and the frequency control circuit 180. The Zener diode Dz may be coupled between a node 512 defined between the second series resistor $R_{S2}$ and the fourth series resistor $R_{S4}$, and the secondary circuit ground reference GNDs.

When the output current $I_{OUT}$ is low, then the operating frequency $f_{op}$ is high. As such, the error signal $V_{ERROR}$ is low and the Zener diode Dz does not clamp the voltage across the fourth series resistor $R_{S4}$. Under such conditions, the detector diode current $I_F$ is:

$$I_F = \frac{V_{ERROR} - 1.3}{R_{s2} + R_{s4}} \tag{5}$$

"1.3" being the forward drop of the detector diode 184 of the optocoupler 182.

When the output current $I_{OUT}$ increases, the operating frequency $f_{op}$ will decrease. Additionally, as the output current $I_{OUT}$ increases, the error signal $V_{ERROR}$ will increase to drive more current IF into the detector diode 184 of the optocoupler 182 to reduce the operating frequency $f_{op}$ of the driver IC 130, according to equation (4). When the error signal $V_{ERROR}$ increases to a certain point (e.g. a clamping threshold value $V_{ERROR\_clamp}$), the Zener diode Dz starts to clamp and the maximum current (e.g., IF) that can be driven into the detector diode 184 will be limited beginning at this moment. The Zener diode Dz begins to clamp the voltage across the fourth series resistor $R_{S4}$ when the voltage at the node 512 is greater than or equal to a Zener voltage $V_{Dz\_clamp}$ of the Zener diode Dz. The Zener diode Dz begins clamping according to the following:

$$(V_{ERROR\_clamp} - 1.3) \times \frac{R_{s4}}{R_{s2} + R_{s4}} + 1.3 = V_{Dz\_clamp} \tag{6}$$

Based on equation (6), the error signal $V_{ERROR\_clamp}$ at the Zener diode Dz clamping moment may be calculated as follows:

$$V_{ERROR\_clamp} = (V_{Dz\_clamp} - 1.3) \times \frac{R_{s2} + R_{s4}}{R_{s4}} + 1.3 \tag{7}$$

The current $I_F$ being driven into the detector diode 184 reaches a maximum ($I_{F\_max}$) at the Zener diode Dz clamping moment as follows:

$$I_{F\_max} = \frac{V_{Dz\_clamp}}{R_{s4}} \tag{8}$$

Any further increase to the error signal $V_{ERROR}$ will not increase the current IF driven into the detector diode 184 because the voltage across the fourth series resistor $R_{S4}$ and the detector diode current $I_F$ is clamped by the Zener diode Dz at the Zener voltage $V_{Dz\_clamp}$.

The maximum current $I_{F\_max}$ from equation (8) may be substituted the detector diode current IF from equation (4) in order to obtain the operating frequency at the Zener diode Dz clamping moment for a specific ambient temperature T as follows:

$$f_{op}(T) = \left[\frac{V_{ref}}{R_1 + R_2} - CTR(T) \times \frac{V_{Dz\_clamp}}{R_{s4}} \times \frac{R_2}{R_1 + R_2}\right] \times 250\left(\frac{\text{KHz}}{\text{mA}}\right) \tag{9}$$

In practical design, the present disclosure may attempt to ensure that the improved half-bridge resonant type DC-DC converter 500 is capable of driving the full maximum output current until a certain threshold temperature $T_{nom\_op\_max}$, which may be, for example, 65 C ambient, associated with the minimum operating frequency $f_{min}$ as follows:

$$\begin{aligned} f_{min} &= f_{op}(T_{nom\_op\_max}) \\ &= \left[\frac{V_{ref}}{R_1 + R_2} - CTR(T_{nom\_op\_max}) \times \frac{V_{Dz\_clamp}}{R_{s4}} \times \frac{R_2}{R_1 + R_2}\right] \times \\ &\quad 250\left(\frac{\text{KHz}}{\text{mA}}\right) \end{aligned} \tag{10}$$

By circuit design, as shown in FIG. 4, the maximum output current $I_{MAX}$ delivered to the load $R_{LOAD}$ occurs at the minimum operating frequency $f_{min}$.

When the ambient temperature $T_{high}$ is greater than the threshold temperature $T_{nom\_op\_max}$, the CTR of the optocoupler 182 will decrease, as shown in FIG. 5. The threshold temperature $T_{nom\_op\_max}$ may also be referred to herein as the normal operating maximum temperature $T_{nom\_op\_max}$. In accordance with equation (10), the operating frequency $f_{op}$ may be higher than $f_{min}$ under these operating conditions, which will result in a reduction in the output current $I_{OUT}$, as shown in FIG. 4. The operating frequency $f_{op}$ for the ambient temperature $T_{high}$ may be calculated as follows:

$$\begin{aligned} f_{op\_min} &< f_{op}(T_{high}) = \\ &\left[\frac{V_{ref}}{R_1 + R_2} - CTR(T_{high}) \times \frac{V_{Dz\_clamp}}{R_{s4}} \times \frac{R_2}{R_1 + R_2}\right] \times 250\left(\frac{\text{KHz}}{\text{mA}}\right) \end{aligned} \tag{11}$$

where $T_{high}$ is greater than $T_{nom\_op\_max}$.

As delineated above, the improved half-bridge resonant type DC-DC converter 500 achieves power clamping and output current $I_{OUT}$ limiting by using the relationship between the CTR of the optocoupler 182 and the ambient temperature T, and also by limiting the maximum current $I_{F\_max}$ that can be driven through the detector diode 184.

When the ambient temperature T increases higher than the normal operating max T_nom_op_max, the output current $I_{OUT}$ may be allowed to fold back or be limited to protect the improved half-bridge resonant type DC-DC converter 500 from overheating. This may help the improved half-bridge resonant type DC-DC converter 500 pass the UL Class P thermal test.

By design, the maximum output current $I_{MAX}$ occurs at the minimum frequency $f_{min}$. At the normal operating maximum temperature $T_{nom\_op\_max}$ (e.g., 65C ambient) the CTR of the optocoupler 182 is "CTR($T_{nom\_op\_max}$)" which may be smaller than at a lower temperature (e.g., 35 C ambient).

The following method may be used for selecting the Zener diode Dz, the second series resistor $R_{S2}$ and the fourth series resistor $R_{S4}$ of the improved half-bridge resonant type DC-DC converter 500. The method may include choosing a Zener diode DZ with a Zener voltage $V_{Dz\_clamp}$ that is about 65% of the maximum output of the error signal $V_{ERROR}$ of the OPAMP 172. In other optional embodiments, the Zener voltage $V_{Dz\_clamp}$ may be between about 50% and about 80% of the maximum output of the error signal $V_{ERROR}$ of the OPAMP 172.

The method may further include solving for the resistance value of the fourth series resistor $R_{S4}$ at the normal operating maximum temperature $T_{nom\_op\_max}$ using equation (10), above.

The method may further include choosing the clamping threshold value $V_{ERROR\_clamp}$ to be about 85% of the maximum output of the error signal $V_{ERROR}$ of the OPAMP 172, which may ensure that the OPAMP does not operate at an output saturated situation. In the output saturated situation, the error signal $V_{ERROR}$ reaches its maximum which means that error signal doesn't change in response to changes in the output current $I_{OUT}$ anymore. Additionally, the output saturated situation may cause the operating frequency $f_{op}$ of the driver IC 130 to be less than the resonant frequency $f_{res}$. In effect, the control loop of the improved half-bridge resonant type DC-DC converter 500 becomes ineffective, which is undesirable for any control loop. In other optional embodiments, the clamping threshold value $V_{ERROR\_clamp}$ may be chosen to be between about 75% and about 95% of the maximum output of the error signal $V_{ERROR}$ of the OPAMP 172.

Now that the values of the Zener voltage $V_{Dz\_clamp}$, the fourth series resistor $R_{S4}$, and the clamping threshold value $V_{ERROR\_clamp}$ are known, the method may include solving for the resistance value of the second series resistor $R_{S2}$ using equation (7), above.

Figure 7:
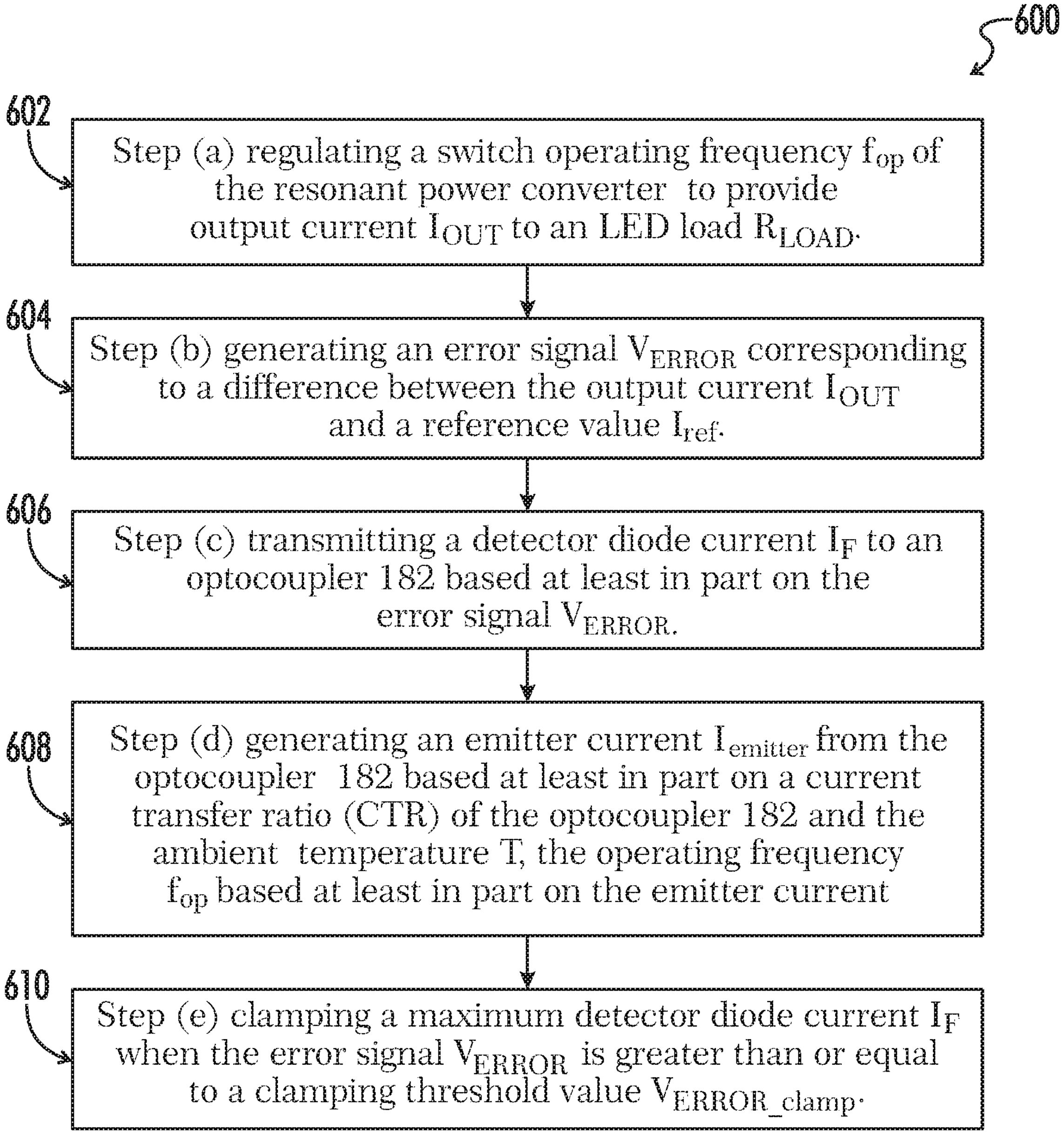
FIG. 7 illustrates a method of power clamping a resonant power converter, such as the ones shown in FIGS. 1 and 6, based on an ambient temperature in accordance with the present disclosure.

Referring to FIG. 7, a method 600 of power clamping a resonant power converter, such as the improved half-bridge resonant type DC-DC converter 500, shown in FIG. 6, based on an ambient temperature T is disclosed herein. The method 600 may include step (a) regulating 602 a switch operating frequency $f_{op}$ of the resonant power converter to provide output current $I_{OUT}$ to an LED load $R_{LOAD}$.

The method 600 may further include step (b) generating 604 an error signal $V_{ERROR}$ corresponding to a difference between the output current $I_{OUT}$ and a reference value $I_{ref}$.

The method 600 may further include step (c) transmitting 606 a detector diode current IF to an optocoupler 182 based at least in part on the error signal $V_{ERROR}$.

The method 600 may further include step (d) generating 608 an emitter current $I_{emitter}$ from the optocoupler 182 based at least in part on a current transfer ratio (CTR) of the optocoupler 182 and the ambient temperature T, the operating frequency $f_{op}$ based at least in part on the emitter current $I_{emitter}$.

The method 600 may further include step (e) clamping 610 a maximum detector diode current IF when the error signal $V_{ERROR}$ is greater than or equal to a clamping threshold value $V_{ERROR\_clamp}$.

In certain optional embodiments, the step (d) of the method 600 may further include reducing the CTR of the optocoupler 182 as the ambient temperature T increases.

In certain optional embodiments, the step (e) of the method 600 may further include limiting the switch operating frequency $f_{op}$ above a minimum operating frequency $f_{min}$ of the resonant power converter based at least in part on the reduced CTR in response to the ambient temperature T increasing.

In certain optional embodiments, the method 600 may further comprise limiting a maximum output current $I_{MAX}$ to the LED load $R_{LOAD}$ based at least in part on the limited switch operating frequency $f_{op}$.

In certain optional embodiments, the method 600 may further comprise providing a detector diode current limiting circuit 210 configured to receive the error signal $V_{ERROR}$ and generate the detector diode current IF to the optocoupler 182. The detector diode current limiting circuit 210 may include a Zener diode Dz and at least one resistor, or as illustrated in FIG. 5, a second series resistor $R_{S2}$ and a fourth series resistor $R_{S4}$.

In certain optional embodiments, the method 600 may further comprise selecting a Zener value $V_{Dz\_clamp}$ of the Zener diode Dz to be about 65% of a maximum error signal $V_{ERROR}$.

In certain optional embodiments, the method 600 may further comprise selecting a resistance value of at least one of the at least one resistor (e.g., the fourth series resistor $R_{S4}$) the based at least in part on a Zener value $V_{Dz\_clamp}$ of the Zener diode Dz and the clamping threshold value $V_{ERROR\_clamp}$.

In certain optional embodiments, the method 600 may further comprise selecting the clamping threshold value $V_{ERROR\_clamp}$ to be about 85% of a maximum error signal $V_{ERROR}$.

The improved half-bridge resonant type DC-DC converter 500 and the method 600 have been proven to be very effective in limiting the driver output current $I_{OUT}$ and output power to relieve the thermal stress when ambient temperature T is higher than the designed maximum value (e.g., the normal operating maximum temperature $T_{nom\_op\_max}$), as well help the driver pass UL Class P thermal test.

To facilitate the understanding of the embodiments described herein, a number of terms are defined below. The terms defined herein have meanings as commonly understood by a person of ordinary skill in the areas relevant to the present invention. Terms such as "a," "an," and "the" are not intended to refer to only a singular entity, but rather include the general class of which a specific example may be used for illustration. The terminology herein is used to describe specific embodiments of the invention, but their usage does not delimit the invention, except as set forth in the claims. The phrase "in one embodiment," as used herein does not necessarily refer to the same embodiment, although it may.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A power converter, comprising:

first and second switching elements coupled across a direct current (DC) power source;

a resonant circuit coupled between an isolation transformer primary winding and an output node between the first and second switching elements;

a current sensing circuit coupled to a secondary winding of the isolation transformer, and configured to provide a current sensing output signal representative of an output current through an output load;

a feedback circuit configured to generate an error signal corresponding to a difference between the current sensing output signal and a reference signal;

a controller comprising a frequency control input terminal, and configured to generate drive signals to the first and second switching elements at a determined operating frequency;

a frequency control circuit comprising an optocoupler coupled between the feedback circuit and the frequency control input terminal of the controller, and configured responsive to a detector diode current to determine the operating frequency of the controller; and a detector diode current limiting circuit coupled between the feedback circuit and the frequency control circuit, the detector diode current limiting circuit configured to clamp the detector diode current based at least in part on the error signal generated by the feedback circuit, to limit a maximum current that can be driven into a detector diode of the optocoupler in the frequency control circuit.

2. The power converter of claim 1, wherein the detector diode current limiting circuit is configured to clamp a maximum detector diode current for the optocoupler when the error signal is greater than or equal to a clamping threshold value.

3. The power converter of claim 2, wherein the clamping threshold value corresponds to a maximum output current at a maximum normal operating temperature.

4. The power converter of claim 2, wherein the clamping threshold value is about 85% of a maximum error signal.

5. The power converter of claim 2, wherein:

the detector diode current limiting circuit includes a first resistor and a second resistor connected in series between the feedback circuit and the frequency control circuit, the detector diode current limiting circuit further including a node between the first resistor and the second resistor.

6. The power converter of claim 5, wherein:

the detector diode current limiting circuit includes a Zener diode coupled to the node between the first resistor and the second resistor; and the Zener diode is configured to limit the effect of the error signal on the detector diode current by clamping the voltage across the second resistor when the error signal is greater than or equal to a clamping threshold value.

7. The power converter of claim 6, wherein a Zener value of the Zener diode is about 65% of a maximum error signal.

8. The power converter of claim 6, wherein a resistance value of at least one of the at least one resistor is based at least in part on a Zener value of the Zener diode and the clamping threshold value.

* * * * *